(12) United States Patent
Balliello

(10) Patent No.: US 7,708,819 B2
(45) Date of Patent: May 4, 2010

(54) DUST-FREE PIGMENT COMPOSITIONS OBTAINABLE BY SPRAY-DRYING

(75) Inventor: Paolo Balliello, Rheinfelden (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 596 days.

(21) Appl. No.: 10/537,020

(22) PCT Filed: Nov. 24, 2003

(86) PCT No.: PCT/EP03/50874

§ 371 (c)(1), (2), (4) Date: Jun. 1, 2005

(87) PCT Pub. No.: WO2004/050771

PCT Pub. Date: Jun. 17, 2004

(65) Prior Publication Data

US 2006/0054058 A1 Mar. 16, 2006

(30) Foreign Application Priority Data

Dec. 4, 2002 (CH) .................................. 2046/02

(51) Int. Cl.
*C09D 11/00* (2006.01)
*C08L 1/26* (2006.01)
*C09D 1/00* (2006.01)
*C08K 9/00* (2006.01)

(52) U.S. Cl. ............ 106/31.28; 106/198.1; 106/197.01; 523/205; 523/206

(58) Field of Classification Search ................ 106/483, 106/300, 308, 31.28, 198.1, 197.01, 438; 523/205, 206

See application file for complete search history.

(56) References Cited

U.S. PATENT DOCUMENTS

| | | | | |
|---|---|---|---|---|
| 2,618,632 A | * | 11/1952 | Klug | ............................ 536/91 |
| 3,728,143 A | * | 4/1973 | Pollard et al. | ................ 106/452 |
| 3,843,380 A | | 10/1974 | Beyn | ........................... 106/300 |
| 3,844,806 A | * | 10/1974 | Wegmann et al. | .............. 8/562 |
| 4,055,439 A | * | 10/1977 | Babler et al. | ................ 106/410 |
| 4,056,402 A | * | 11/1977 | Guzi, Jr. | .................. 106/194.2 |
| 4,177,082 A | * | 12/1979 | Robertson | .................... 106/500 |
| 4,264,552 A | * | 4/1981 | McMahon et al. | ........... 264/117 |
| 5,274,010 A | | 12/1993 | Bugnon et al. | ............. 523/206 |
| 5,401,780 A | | 3/1995 | Bugnon et al. | ............. 523/206 |
| 5,455,288 A | | 10/1995 | Needham | .................... 523/205 |
| 5,681,876 A | * | 10/1997 | Schneider et al. | ........... 523/351 |
| 5,900,050 A | * | 5/1999 | Hayden et al. | ............... 106/493 |
| 6,180,694 B1 | | 1/2001 | Bugnon et al. | .............. 523/205 |
| 6,288,142 B1 | | 9/2001 | Bugnon et al. | .............. 523/206 |

FOREIGN PATENT DOCUMENTS

| | | | |
|---|---|---|---|
| DE | 2841566 | | 4/1980 |
| EP | 0466646 | | 1/1992 |
| GB | 842791 | | 7/1960 |
| GB | 1176217 | * | 1/1970 |

* cited by examiner

*Primary Examiner*—Roy King
*Assistant Examiner*—Shuangyi Abu Ali
(74) *Attorney, Agent, or Firm*—Joseph C. Suhadolnik

(57) ABSTRACT

The invention relates to a composition comprising from 92 to 97% by weight pigment and from 3 to 8% by weight binder, in each case based on the composition, wherein the binder is a mixture comprising: from 5 to 60% by weight, based on the binder, of modified cellulose wherein, on average, per glucose unit, from 0.5 to 1.4 hydroxyl hydrogen atoms are replaced by $R_1$, from 0.25 to 0.6 hydroxyl hydrogen atoms are replaced by $R_2$, or from 0.5 to 1.4 hydroxyl hydrogen atoms are replaced by $R_1$, and from 0 to 0.6 hydroxyl hydrogen atoms are replaced by $R_2$; and from 40 to 95% by weight, based on the binder, of a compound of formula (I) wherein Q is a hydrocarbon radical containing from 8 to 24 carbon atoms, unsubstituted or mono- to tri-substituted by hydroxy or $OR_1$, each $R_1$, independently of any other $R_1$, is $C_1$-$C_4$alkyl or $C_1$-$C_4$alkylcarbonyl, each $R_2$, independently of any other $R_2$, is an organic group different from $R_1$ and containing from 2 to 10 carbon, from 0 to 4 oxygen and from 0 to 2 nitrogen atoms, and $R_3$ and $R_4$ are each independently of the other hydrogen, $R_1$, $R_2$, $C_5$-$C_8$alkyl, $C_5$-$C_8$alkylcarbonyl, $C_5$-$C_8$alkenyl, $C_5$-$C_8$alkenylcarbonyl, $C_5$-$C_8$cycloalkyl, $C_5$-$C_8$cycloalkylcarbonyl, $C_5$-$C_8$cycloalkenyl, $C_5$-$C_8$cycloalkenylcarbonyl, phenyl, benzoyl, tolyl, methylbenzoyl, benzyl, phenylacetyl, phenethyl or styryl. The compositions according to the invention are dust-free and produce outstanding colorations. The use thereof as colorants for, especially, polyolefins and the preparation thereof, especially by aqueous dispersal and spray-drying, are also claimed.

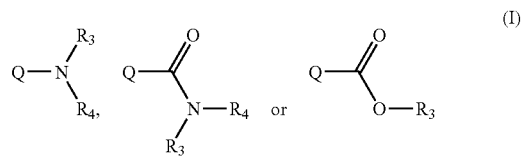

(I)

19 Claims, No Drawings

DUST-FREE PIGMENT COMPOSITIONS OBTAINABLE BY SPRAY-DRYING

The demands made of pigment preparations are becoming ever greater. The development of as little dust as possible during manipulation and also good colouristic results, which demand excellent dispersibility, are especially important. The invention relates to pigment preparations based on a basically binary binder formulation of cellulose derivatives and fatty acid or fatty amine derivatives, which can be obtained in a high yield by very simple means by spray-drying and which exhibit exceptionally good results on application.

U.S. Pat. No. 5,455,288 discloses dustless pigment granules formed in a mixer by means of fictional heat. Fatty acid esters and amides (especially erucamide), in a typical amount of from 2 to 20% by weight, are used as binders.

U.S. Pat. No. 4,264,552 discloses the production of a substantially dry, low-dusting and free-flowing granular pigment by spraying pigment material with water in a fluidised-bed apparatus. As binders there are used, inter alia, optionally ethoxylated fatty acid amines and amides in an amount of from 0.5 to 20% by weight. In Example 18, an amine mixture comprising hydroxypropyl cellulose and unsaturated $C_{18}$ alcohol is combined, the dust index being reduced from 78 to 30. In Example 19, abietyl-amine, hydroxyethyl cellulose and sodium alkyl naphthalene sulfonate are used together.

The properties of cellulose derivatives differ greatly depending on the type of substitution and degree of substitution of the hydroxy groups. Commercially available hydroxyethyl celluloses having an average degree of substitution (DS) of from 0.85 to 1.35 and a degree of molar substitution (MS) of from 1.5 to 3 and also commercially available hydroxypropyl celluloses having a degree of molar substitution (MS) of from 4 to 4.5 are known to be water-soluble whereas, for example, methyl cellulose having a low degree of substitution is soluble only in alkaline media and methyl cellulose having a high degree of substitution is soluble only in organic solvents.

Novel compositions have now been found which meet the highest colouristic demands and which are very simple to produce. In addition, surprisingly, it is possible, by extremely simple means, to obtain the pigment compositions according to the invention in the form of dust-free granules by spray-drying.

The invention accordingly relates to a composition comprising from 92 to 97% by weight pigment and from 3 to 8% by weight binder, in each case based on the composition, wherein the binder is a mixture comprising from 5 to 60% by weight, based on the binder, of modified cellulose wherein, on average, per glucose unit, from 0.5 to 1.4 hydroxyl hydrogen atoms are replaced by $R_1$, from 0.25 to 0.6 hydroxyl hydrogen atoms are replaced by $R_2$, or from 0.5 to 1.4 hydroxyl hydrogen atoms are replaced by $R_1$ and from 0 to 0.6 hydroxyl hydrogen atoms are replaced by $R_2$; and from 40 to 95% by weight, based on the binder, of a compound of formula

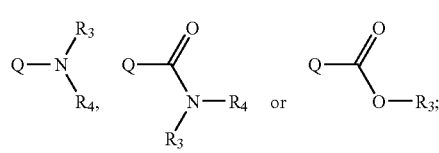

wherein Q is a hydrocarbon radical containing from 8 to 24 carbon atoms, unsubstituted or mono- to tri-substituted by hydroxy or $OR_1$, each $R_1$, independently of any other $R_1$, is $C_1$-$C_4$alkyl or $C_1$-$C_4$alkylcarbonyl, each $R_2$, independently of any other $R_2$, is an organic group different from $R_1$ and containing from 2 to 10 carbon, from 0 to 4 oxygen and from 0 to 2 nitrogen atoms, and $R_3$ and $R_4$ are each independently of the other hydrogen, $R_1$, $R_2$, $C_5$-$C_8$alkyl, $C_5$-$C_8$alkylcarbonyl, $C_5$-$C_8$alkenyl, $C_5$-$C_8$alkenylcarbonyl, $C_5$-$C_8$cycloalkyl, $C_5$-$C_8$cycloalkylcarbonyl, $C_5$-$C_8$cycloalkenyl, $C_5$-$C_8$cycloalkenylcarbonyl, phenyl, benzoyl, tolyl, methylbenzoyl, benzyl, phenylacetyl, phenethyl or styryl.

The glucose units —$[C_6H_{10}O_5]$— in modified cellulose are usually in the form of glucopyranosyl, pairs of which form a cellobiose unit They may, however, also be in open hydrolysed form.

$R_1$ is preferably methyl or ethyl, especially methyl.

$R_2$ is preferably benzyl, $C_1$-$C_4$alkylene-$COOR_3$, $C_2$-$C_3$alkylene-$NR_3R_4$ or $[C_2$-$C_3$alkylene-$O]_{1-4}$—$R_3$, especially $[C_2$-$C_3$alkylene-$O]_{1-2}$—H.

When hydroxyl hydrogen atoms are replaced by both $R_1$ and $R_2$, then the total of hydroxyl hydrogen atoms replaced by $R_1$ and $R_2$ is preferably about from 0.6 to 1.5.

$R_3$ and/or $R_4$ are preferably hydrogen or $R_2$, especially hydrogen, very especially both simultaneously hydrogen.

Q may be linear, branched, cyclic (including polycyclic), saturated, mono-unsaturated, or conjugated or isolated poly-unsaturated (e.g. di- or tri-unsaturated) and may also contain one or more (e.g. two) aromatic rings. Preferably, Q is saturated or monounsaturated and linear or branched. A plurality of rings may be individual or fused, as in, for example, terpenes, steroids or polyaromatic compounds. For high demands, the number of carbon atoms in Q may be related to the number of carbon atoms in $R_3$ as follows. Q preferably has at least 12 carbon atoms, especially when $R_3$ is hydrogen, $C_1$-$C_4$alkyl or $C_1$-$C_4$alkylcarbonyl. Special preference is given to Q being a hydrocarbon radical containing from 14 to 20 carbon atoms, especially a hydrocarbon radical containing from 16 to 18 carbon atoms, and to $R_3$ being hydrogen, methyl or ethyl, especially hydrogen.

The binder may optionally comprise as components from 0 to 20% by weight of any desired further substances, preferably organic or inorganic acids or non-ionic compounds. Acids are, where applicable, contained in an amount such that, on dispersal of one part by weight of the composition according to the invention in four parts by weight of water, there results a pH value of from 4 to 7, preferably from 4.5 to 6.5, especially from 5 to 6.

The acid is, for example, hydrochloric acid, sulfuric acid or an organic acid such as formic acid, acetic acid, propionic acid, lactic acid, oxalic acid, malonic acid, succinic acid, glutaric acid, adipic acid, maleic acid, fumaric acid, butyric acid, isobutyric acid, pivalic acid, benzoic acid, phenylacetic acid or phthalic acid.

Preferred organic acids have from 1 to 8 carbon atoms, especially from 1 to 4 carbon atoms, and are unsubstituted or substituted by hydroxy. Special preference is given to formic acid and, especially, acetic acid.

However, apart from the acid, the amount of further components is preferably as small as possible; special preference is given to there being no further component.

Pigments may be organic or inorganic and are, for example, from the 1-amino-anthraquinone, anthanthrone, anthrapyrimidine, azo, azomethine, quinacridone, quinacridone-quinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series, including those, where applicable, in the form of metal complexes or lakes. Azos may be, for example, mono- or dis-azo pigments from any known sub-class, obtainable, for example, by coupling, condensation or lake formation.

By way of example, examples of organic pigments include Colour index Pigment Yellow 3, 12, 13, 14, 17, 24, 34, 42, 53, 62, 74, 83, 93, 95, 108, 109, 110, 111, 119, 123, 128, 129, 139, 147, 150, 164, 168, 173, 174, 184, 188, 191, 191:1, 193, 199, Pigment Orange 5, 13, 16, 34, 40, 43, 48, 49, 51, 61, 64, 71, 73, Pigment Red 2, 4, 5, 23, 48:1, 48:2, 48:3, 48:4, 52:2, 53:1, 57, 57:1, 88, 89, 101, 104, 112, 122, 144, 146, 149, 166, 168, 177, 178, 179, 181, 184, 190, 192, 194, 202, 204, 206, 207, 209, 214, 216, 220, 221, 222, 224, 226, 254, 255, 262, 264, 270, 272, Pigment Brown 23, 24, 33, 42, 43, 44, Pigment Violet 19, 23, 29, 31, 37, 42, Pigment Blue 15, 15:1, 15:2, 15:3, 15:4, 15:6, 16, 28, 29, 60, 64, 66, Pigment Green 7, 17, 36, 37, 50, Pigment White 6, Pigment Black 7, 12, 27, 30, 31, 32, Vat Red 74, 3,6-di(3'-cyano-phenyl)-2,5-dihydro-pyrrolo[3,4]pyrrole-1,4-dione or 3-phenyl-6-(4-tert-butyl-phenyl)-2,5-dihydro-pyrrolo[3,4-c]pyrrole-1,4-dione.

Preference is given to azobenzimidazolone, disazo and polycyclic pigments and also to isoindolinones and diketopyrrolopyrroles.

Special preference is given to the pigment being a quinacridone, dioxazine, perylene, diketopyrrolopyrrole or disazo condensation pigment Quinacridones are preferably prepared by oxidation of dihydroquinacridones using hydrogen peroxide, as described, for example, in U.S. Pat. No. 5,840,901 or WO-02/077104.

The pigments may be single chemical compounds or mixtures of a plurality of components, including solid solutions or mixed crystals containing a plurality of chemical compounds. Preference is given to uniformly crystalline pigments as they usually yield greater colour saturation than physical mixtures and mixed phases. If duller shades are nevertheless desired in the final application, this may be achieved by toning down with colorants of different colour in a manner known per se.

The compositions according to the invention consist, preferably, only of pigment and binder, especially of pigment, methyl cellulose, and a compound of formula

neutralised with approximately one equivalent of acid. They have a particle size of preferably from 0.005 to 10 mm, especially from 0.05 to 0.5 mm (that is to say, fine granules).

The compositions according to the invention can be used for any customary purpose, for example in the mass-colouring of polymers (or as colorants for other organic materials of natural or synthetic origin having a molecular weight usually in the range from $10^3$ to $10^8$ g/mol), including those in the form of fibres, surface-coating compositions (including special-effect finishes, including those for the automotive sector) and printing inks, or also in so-called resists or as toners. Such uses will be so obvious to the person skilled in the art that it is possible to dispense with listing them here. They are also disclosed in numerous patent specifications and technical works, for example "Industrielle Organische Pigmente" (W. Herbst+K. Hunger, VCH Weinheim/New York, new editions continually published in German and English).

The principal advantages are the very low dust formation, high tinctorial strength and colour saturation, outstanding dispersibility, excellent rheology, which allows use in high concentrations, and also a high degree of compatibility with a very wide range of substrates to be pigmented so that the range of pigments can be streamlined in economically advantageous manner. The compositions according to the invention are moreover distinguished by good general properties, such as resistance to migration, to light and to weathering.

The pigment compositions according to the invention have proved to be especially advantageous in isotactic, syndiotactic and atactic polyolefins, especially in polybutadiene, polybutene, polyisobutene, poly(4-methyl-1-pentene), polyethylene, polypropylene, polystyrene and also ethylene/propylene, styrene/acrylonitrile, acrylonitrile/butadiene/styrene and styrene/butadiene copolymers, e.g. PEC, PE-HD, PE-LD, PE-LLD, PE-MD, PE-UHM(W), PE-V, PEX, EPM, EPDM, ABS or EPS, and also in vinyl polymers including PVC, polyvinyl acetate, polyacrylates polymethacrylates and copolymers thereof, and also copolymers of polyolefins with, for example, polyethers, polyether ketones or polyurethanes.

The colouring of high molecular weight organic substances with the compositions according to the invention is carried out, for example, by admixing the compositions, where appropriate in the form of masterbatches, with the substrates using roll mills or mixing or grinding apparatuses. The coloured material is then brought into the desired final form using methods known per se, such as calendering, compression moulding, extrusion, coating, pouring or injection moulding. Where appropriate, known additives, for example dispersants, rheology improvers, film-formers, siccatives, plasticisers, fillers, reinforcing agents, antifoams and/or other additives, such as processing adjuvants, UV absorbers, luminescence quenchers, antioxidants, free radical capture agents (e.g. for $^1O_2$) and/or other stabilisers, can also be added in any desired amounts known per se. The additives can be incorporated in the polymers before, at the same time as or after the compositions according to the invention. It is furthermore possible for the high molecular weight organic substances to be admixed with other colour-imparting constituents, such as white, coloured, black or effect pigments in any desired amounts, in addition to the composition according to the invention, in order to obtain different hues.

Colouring is carried out preferably by mixing the pigment composition according to the invention with the polyolefin granules or powder and processing the mixture into fibres, films or granules (including those in the form of masterbatches). The latter can themselves then be, for example, spun into fibres, calendered into sheets, extruded into profiles or formed into articles in an injection-moulding method.

The invention accordingly relates also to a method of pigmenting a polyolefin (including polystyrenes and vinyl polymers) or a polyolefin copolymer, wherein from 0.01 to 230% by weight, preferably from 0.05 to 5% by weight, based on the polyolefin or polyolefin copolymer, of a composition according to the invention is incorporated in a polyolefin or polyolefin copolymer.

The composition according to the invention is prepared by any advantageous method, but preferably in aqueous dispersion at a pH value of from 4 to 7, preferably from 4.5 to 6.5, especially from 5 to 6. To that end the constituents of the composition according to the invention and water are added in succession or simultaneously to an apparatus wherein by any suitable means the pigment particles are dispersed as homogeneously as possible, after which the aqueous medium is removed by suitable means. The amount of aqueous medium is advantageously from 1.5 times to 100 times, preferably from 2.5 times to 10 times, especially from 3 times to 6 times, more especially from 3.5 times to 4.5 times, the dry pigment weight.

Advantageous aqueous media are water and also single-phase mixtures of at least 30% by weight, preferably at least 80% by weight, water with inert, neutral liquids, for example customary hydrophilic solvents, such as alcohols or ketones (especially methanol, ethanol, acetone or methyl ethyl ketone). When inert, neutral liquids are present, they preferably have a boiling point of from 50 to 120° C. or form, together with water, an azeotrope having a boiling point of from 50 to 120° C.

Known dispersing means are, for example, stirrers of any desired geometry and stirring speed, dispersers, homogenisers, nozzle mixers, drums, kneaders, screw apparatuses, shaking devices, vibrators or ultrasonic devices. Known means of water removal, optionally after prior filtration or centrifugation, are, for example, dryers or lyophilisation devices, preferably spray dryers.

The invention accordingly relates also to a method of preparing a composition according to the invention, wherein an aqueous medium, a pigment, and a binder comprising from 5 to 60% by weight, based on the binder, of modified cellulose wherein, on average, per glucose unit, from 0.5 to 1.4 hydroxyl hydrogen atoms are replaced by $R_1$, from 0.25 to 0.6 hydroxyl hydrogen atoms are replaced by $R_2$, or from 0.6 to 1.4 hydroxyl hydrogen atoms are replaced by $R_1$ and from 0 to 0.6 hydroxyl hydrogen atoms are replaced by $R_2$; and from 40 to 95% by weight, based on the binder, of a compound of formula

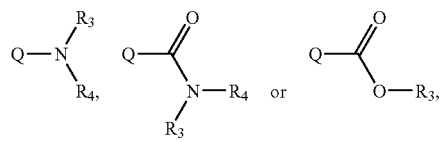

and, optionally, from 0 to 20% by weight of further substances;

wherein Q is a hydrocarbon radical containing from 8 to 24 carbon atoms, unsubstituted or mono- to tri-substituted by hydroxy or $OR_1$, each $R_1$, independently of any other $R_1$, is $C_1$-$C_4$alkyl or $C_1$-$C_4$alkylcarbonyl, each $R_2$, independently of any other $R_2$, is an organic group different from $R_1$ and containing from 2 to 10 carbon, from 0 to 4 oxygen and from 0 to 2 nitrogen atoms, and $R_3$ and $R_4$ are each independently of the other hydrogen, $R_1$, $R_2$, $C_5$-$C_8$alkyl, $C_5$-$C_8$alkylcarbonyl, $C_5$-$C_8$alkenyl, $C_5$-$C_8$alkenylcarbonyl, $C_5$-$C_8$cycloalkyl, $C_5$-$C_8$cycloalkylcarbonyl, $C_5$-$C_8$cycloalkenyl, $C_5$-$C_8$cycloalkenylcarbonyl, phenyl, benzoyl, tolyl, methylbenzoyl, benzyl, phenylacetyl, phenethyl or styryl, and wherein the weight ratio of pigment to binder is from 92:8 to 97:3 and the weight ratio of pigment to aqueous medium is from 1:1.5 to 1:100, preferably from 1:2.5 to 1:10, are successively or simultaneously added to an apparatus which is so operated that there results an aqueous dispersion having a pH value of from 4 to 7, preferably from 4.5 to 6.5, especially from 5 to 6, and the aqueous medium is subsequently removed.

The pigment is preferably employed in the form of a moist pigment cake directly from synthesis or conditioning (e.g. recrystallisation or salt kneading). The aqueous medium is preferably removed by spray-drying, which surprisingly, when the weight ratio of pigment to binder is as stated above and the operating conditions of the spray dryer are as customarily used, produces unexpectedly good results in terms of colouristic properties, dispersibility and dust rating. As described hereinbefore, in order to adjust the pH value, a small amount of acid is added, if necessary, which usually remains as a constituent of the compositions according to the invention on subsequent drying.

The addition sequence is, in itself, unimportant and is usually governed both by the physical properties of the ingredients, especially their viscosity, and by the apparatus available. It is possible, for example, first to stir together water and pigment presscake in a vessel, followed by addition (in the order stated) of a fatty amine, modified cellulose and acid, it also being possible to add the latter before the fatty amine or between the fatty amine and the modified cellulose. Alternatively it may prove advantageous first to introduce water into the vessel, to incorporate the modified cellulose therein and then, after a readily stirrable homogeneous mass has been obtained, to add the fatty amine and acid (or, instead, the binary salt thereof and only at the end to incorporate the pigment presscake in portions or continuously. However, the invention is in no way limited to those sequences, which are mentioned solely by way of example, but rather allows all kinds of alternatives, as the person skilled in the art will readily recognise.

The aqueous medium may be removed completely or only in part, any residual moisture that remains being advantageously from 0 to 20% by weight, preferably from 0 to 5% by weight, especially from 0 to 2% by weight, based on the composition according to the invention.

The Examples that follow illustrate the invention without, however, limiting its scope (unless otherwise specified, "parts" or "%" are always parts by weight or percent by weight, respectively):

EXAMPLE 1

756 parts by weight of 25% aqueous presscake of C.I. Pigment Red 144 direct from synthesis are slurried with 9 parts by weight of tallow amine (Armeen TD™, Akzo Nobel), 1 part by weight of methyl cellulose (Metolose SM-100™, approximately 30% methoxy content, ShinEtsu) and 189 parts by weight of water to form a suspension. The pH value is adjusted to 5.0 using hydrochloric acid and stirring is continued. In the process, the initially slimy viscous phase becomes a homogeneous suspension which at 25° C. has a viscosity of about from 10 to 25 mPa·s at a shear rate of from 200 to 1000 sec$^{-1}$. The homogeneous slurry comprises only particles of <10 μm and is spray-dried without difficulty ($T_{in}$=148° C.; $T_{out}$=102° C.; 200 Pa below atmospheric pressure). The product granules, which have a residual moisture content of <1% by weight, have an 8" value of ≦20 in the sedimentation measurement apparatus according to Lorenz (DIN 55992) and produce excellent results in high-density polyethylene.

EXAMPLE 2

The procedure is analogous to Example 1 but uses an aqueous presscake of C.I. Pigment Red 254 instead of Pigment Red 144. The pH value is adjusted to 5.5 using acetic acid. The homogeneous slurry has a measured average particle size of about 1.1 μm, with a specific surface area of approximately 10 m²/g, and is spray-dried without difficulty ($T_{in}$=220° C.; $T_{out}$=104° C.; 200 Pa below atmospheric pressure). The granules are similarly dust-free, the results in polyethylene being analogous to Example 1.

EXAMPLE 3

The procedure is analogous to Example 1 but uses an aqueous presscake of C.I. Pigment Orange 64 instead of Pigment Red 144 and 294 instead of 189 parts by weight of water. A viscosity of from 50 to 850 mPa·s is achieved at a shear rate of from 5 to 500 sec$^1$. The homogeneous slurry has a measured average particle size of about 0.80 μm, with a specific surface area of approximately 12 m²/g, and is spray-dried without difficulty ($T_{in}$=210° C.; $T_{out}$=105° C.; 200 Pa below atmospheric pressure). The granules are similarly dust-free, the results in polyethylene being analogous to Example 1.

EXAMPLE 4

The procedure is analogous to Example 1 but uses an aqueous presscake of C.I. Pigment Yellow 110 instead of Pigment Red 144 and omits the addition of water. The pH value is adjusted to 5.8 using formic acid. A viscosity of from 10 to 30 mPa·s is achieved at a shear rate of from 5 to 500 sec$^{-1}$. The homogeneous slurry has a measured average particle size of about 10 μm, with a specific surface area of approximately 10 m²/g, and is spray-dried without difficulty ($T_{in}$=180° C.; $T_{out}$=103° C.; 200 Pa below atmospheric pressure). The granules are similarly dust-free, the results in polyethylene being analogous to Example 1.

EXAMPLES 5-6

Example 1 is repeated, but using, respectively, Metolose SM-15™ and 540 parts by weight of water, and Metolose SM-1500™ and 108 parts by weight of water (methyl celluloses of about the same methoxy content but of different viscosity). Comparable results are obtained.

EXAMPLES 7-8

Example 1 is repeated, but using, respectively, Metolose 90SH-100™ and 218 parts by weight of water, and Metolose 90SH-4000SR™ and 511 parts by weight of water (hydroxypropyl methyl celluloses having a methoxy content of about 23-24% and hydroxypropoxy contents of about 5-6% and 8-9%, respectively). Comparable results are obtained.

EXAMPLE 9

Example 1 is repeated, but using Pharmacoat 603™ (ShinEtsu, hydroxypropyl methyl cellulose having a methoxy content of about 29-30% and a hydroxypropoxy content of about 8-9%) and 218 parts by weight of water. Comparable results are obtained.

EXAMPLE 10

Example 1 is repeated, but using Pharmacoat 904™ (ShinEtsu, hydroxypropyl methyl cellulose having a methoxy content of about 23-24% and a hydroxypropoxy content of about 5-6%) and no additional water. Comparable results are obtained.

EXAMPLES 11-13

Example 1 is repeated, but using, respectively, L-HPC LH-11™ and 168 parts by weight of water, L-HPC LH-21™ and 101 parts by weight of water, and L-HPC LH-31™ and 111 parts by weight of water (ShinEtsu, low-substituted hydroxypropyl celluloses having a hydroxypropoxy content of about 10-11%). Comparable results are obtained.

EXAMPLES 14-40

Examples 2-4 are repeated, but using the modified celluloses according to Examples 5-13 and appropriately modifying the amount of water.

EXAMPLES 41-80

Examples 1-40 are repeated, but using Armeen T™ instead of Armeen TD™.

What is claimed is:

1. A composition comprising from 92 to 97% by weight organic pigment and from 3 to 8% by weight binder, in each case based on the composition, wherein the binder is a mixture consisting of from 5 to 60% by weight, based on the binder, of modified cellulose wherein, on average, per glucose unit, from 0.5 to 1.4 hydroxyl hydrogen atoms are replaced by $R_1$, or from 0.25 to 0.6 hydroxyl hydrogen atoms are replaced by $R_2$, or from 0.5 to 1.4 hydroxyl hydrogen atoms are replaced by $R_1$ and from 0 to 0.6 hydroxyl hydrogen atoms are replaced by $R_2$; and from 40 to 95% by weight, based on the binder, of a compound of formula

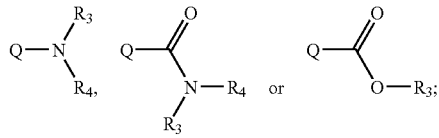

and from 0 to 20% by weight of further substances;

wherein Q is a hydrocarbon radical containing from 12 to 24 carbon atoms, unsubstituted or mono- to tri-substituted by hydroxy or $OR_1$, each $R_1$, independently of any other $R_1$, is unsubstituted $C_1$-$C_4$alkyl or unsubstituted $C_1$-$C_4$alkylcarbonyl, each $R_2$, independently of any other $R_2$, is an organic group different from $R_1$ and consisting of 2 to 10 carbon, from 0 to 4 oxygen and from 0 to 2 nitrogen atoms, and $R_3$ and $R_4$ are each independently of the other hydrogen, $R_1$, $R_2$, $C_5$-$C_8$alkyl, $C_5$-$C_8$alkylcarbonyl, $C_5$-$C_8$alkenyl, $C_5$-$C_8$alkenylcarbonyl, $C_5$-$C_8$cycloalkyl, $C_5$-$C_8$cycloalkylcarbonyl, $C_5$-$C_8$cycloalkenyl, $C_5$-$C_8$cycloalkenylcarbonyl, phenyl, benzoyl, tolyl, methylbenzoyl, benzyl, phenylacetyl, phenethyl or styryl.

2. A composition according to claim 1, wherein $R_1$ is methyl or ethyl, $R_2$ is benzyl, $C_1$-$C_4$alkylene-$COOR_3$, $C_2$, $C_3$-alkylene-$NR_3R_4$ or $[C_2$-$C_3$alkylene-$O]_{1-2}$-H, $R_3$ and/or $R_4$ are hydrogen, methyl or ethyl.

3. A composition according to claim 1, wherein the binder comprises from 0 to 20% by weight of an organic acid which has from 1 to 8 carbon atoms and is unsubstituted or substituted by hydroxy.

4. A composition according to claim 1, wherein the pigment is selected from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone and thioindigo series.

5. A method of pigmenting a polyolefin or a polyolefin copolymer, wherein from 0.01 to 230% by weight, based on the polyolefin or polyolefin copolymer, of a composition according to claim 1 is incorporated in a polyolefin or polyolefin copolymer.

6. A method of preparing a composition according to claim 1, wherein an aqueous medium, an organic pigment, and a binder consisting of from 5 to 60% by weight, based on the binder, of modified cellulose wherein, on average, per glucose unit, from 0.5 to 1.4 hydroxyl hydrogen atoms are replaced by $R_1$, or from 0.25 to 0.6 hydroxyl hydrogen atoms are replaced by $R_2$, or from 0.5 to 1.4 hydroxyl hydrogen atoms are replaced by $R_1$ and from 0 to 0.6 hydroxyl hydrogen atoms are replaced by $R_2$; and from 40 to 95% by weight, based on the binder, of a compound of formula

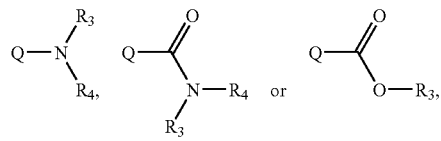

and from 0 to 20% by weight of further substances;
wherein Q is a hydrocarbon radical containing from 12 to 24 carbon atoms, unsubstituted or mono- to tri-substituted by hydroxy or $OR_1$,
each $R_1$, independently of any other $R_1$, is unsubstituted $C_1$-$C_4$alkyl or unsubstituted $C_1$-$C_4$alkylcarbonyl,
each $R_2$, independently of any other $R_2$, is an organic group different from $R_1$ and consisting of 2 to 10 carbon, from 0 to 4 oxygen and from 0 to 2 nitrogen atoms,
and. $R_3$ and $R_4$ are each independently of the other hydrogen, $R_1$, $R_2$, $C_5$-$C_8$alkyl, $C_5$-$C_8$alkylcarbonyl, $C_5$-$C_8$alkenyl, $C_5$-$C_8$alkenylcarbonyl, $C_5$-$C_8$cycloalkyl, $C_5$-$C_8$cycloalkylcarbonyl, $C_5$-$C_8$cycloalkenyl, $C_5$-$C_8$cycloalkenylcarbonyl, phenyl, benzoyl, tolyl, methylbenzoyl, benzyl, phenylacetyl, phenethyl or styryl,
and wherein the weight ratio of pigment to binder is from 92:8 to 97:3 and the weight ratio of pigment to aqueous medium is from 1:1.5 to 1:100, are successively or simultaneously added to an apparatus which is so operated that there results an aqueous dispersion having a pH value of from 4 to 7, and the aqueous medium is subsequently removed.

7. A method according to claim 6, wherein the pigment is added to the apparatus in the form of a moist pigment cake.

8. A method according to claim 6, wherein the aqueous medium is removed by spray-drying.

9. A method of pigmenting organic material, wherein a composition according to claim 1 is incorporated in an organic material of natural or synthetic origin having a molecular weight in the range from $10^3$ to $10^8$ g/mol.

10. A composition according to claim 1, wherein the pigment is selected from the quinacridone, dioxazine, perylene, diketopyrrolopyrrole and disazo condensation pigment series.

11. A composition according to claim 3, wherein the pigment is from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone or thioindigo series.

12. A method of pigmenting a polyolefin or a polyolefin copolymer, wherein from 0.01 to 230% by weight, based on the polyolefin or polyolefin copolymer, of a composition according to claim 3 is incorporated in a polyolefin or polyolefin copolymer.

13. A method of pigmenting a polyolefin or a polyolefin copolymer, wherein from 0.01 to 230% by weight, based on the polyolefin or polyolefin copolymer, of a composition according to claim 4 is incorporated in a polyolefin or polyolefin copolymer.

14. A method of pigmenting a polyolefin or a polyolefin copolymer, wherein from 0.05 to 5% by weight, based on the polyolefin or polyolefin copolymer, of a composition according to claim 1 is incorporated in a polyolefin or polyolefin copolymer.

15. A method of pigmenting a polyolefin or a polyolefin copolymer, wherein from 0.05 to 5% by weight, based on the polyolefin or polyolefin copolymer, of a composition according to claim 3 is incorporated in a polyolefin or polyolefin copolymer.

16. A method of pigmenting a polyolefin or a polyolefin copolymer, wherein from 0.05 to 5% by weight, based on the polyolefin or polyolefin copolymer, of a composition according to claim 4 is incorporated in a polyolefin or polyolefin copolymer.

17. A method according to claim 6, wherein the pigment is selected from the 1-aminoanthraquinone, anthanthrone, anthrapyrimidine, azo, azomethine, quinacridone, quinacridonequinone, quinophthalone, dioxazine, diketopyrrolopyrrole, flavanthrone, indanthrone, isoindoline, isoindolinone, isoviolanthrone, perinone, perylene, phthalocyanine, pyranthrone and thioindigo series.

18. A method according to claim 6, wherein the weight ratio of pigment to aqueous medium is from 1:2.5 to 1:10.

19. A method according to claim 6, wherein there results an aqueous dispersion having a pH value of from 4.5 to 6.5.

* * * * *